United States Patent [19]

Bratzler

[11] Patent Number: 4,571,964
[45] Date of Patent: Feb. 25, 1986

[54] TRAILER HITCH LOCK

[76] Inventor: William R. Bratzler, P.O. Box 338, Palisade, Colo. 81526

[21] Appl. No.: 654,347

[22] Filed: Sep. 25, 1984

[51] Int. Cl.⁴ ............................................. E05B 73/00
[52] U.S. Cl. ........................................ 70/58; 70/258; 280/507
[58] Field of Search ...................... 70/58, 57, 14, 258; 280/507, 511, 514

[56] References Cited

U.S. PATENT DOCUMENTS

| 3,237,969 | 3/1966 | Geresy | 280/507 |
| 3,434,741 | 3/1969 | Grant, Jr. | 280/507 |
| 3,820,823 | 6/1974 | Beaston | 70/258 |
| 3,884,055 | 5/1975 | Vuillemot | 70/58 |
| 4,032,171 | 6/1977 | Allen et al. | 280/507 |
| 4,082,311 | 4/1978 | Hammen | 280/507 |
| 4,141,569 | 2/1979 | Dilk | 280/507 |
| 4,459,832 | 7/1984 | Avrea | 70/58 |

Primary Examiner—Robert L. Wolfe
Attorney, Agent, or Firm—Dowell & Dowell

[57] ABSTRACT

A locking assembly to prevent unauthorized access to a trailer hitch which includes a metallic casing which is slideably placed over and around the socket end portion of the hitch and which cooperatively receives a locking bar having a first extended portion which is receivable within the hitch socket and a second extended portion which is selectively secured to the interior of the metallic casing to thereby lock the assembly in fixed position with respect to the trailer hitch.

14 Claims, 6 Drawing Figures

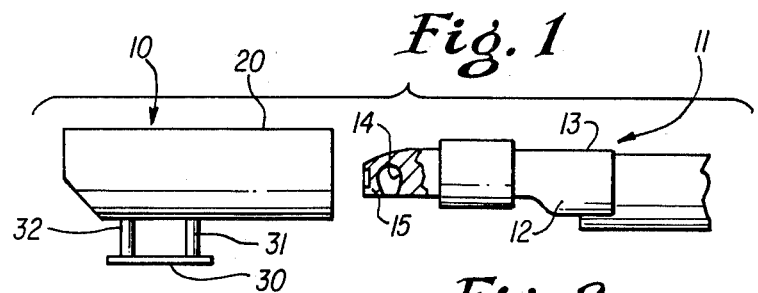
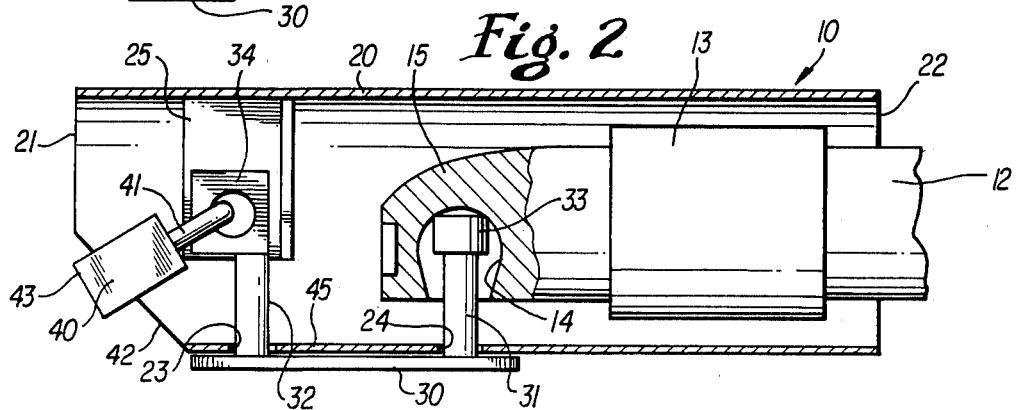
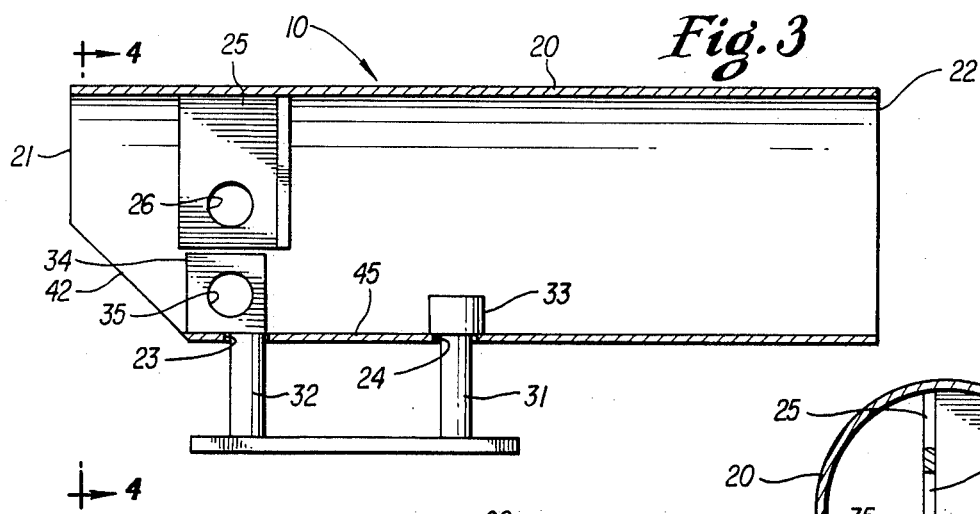
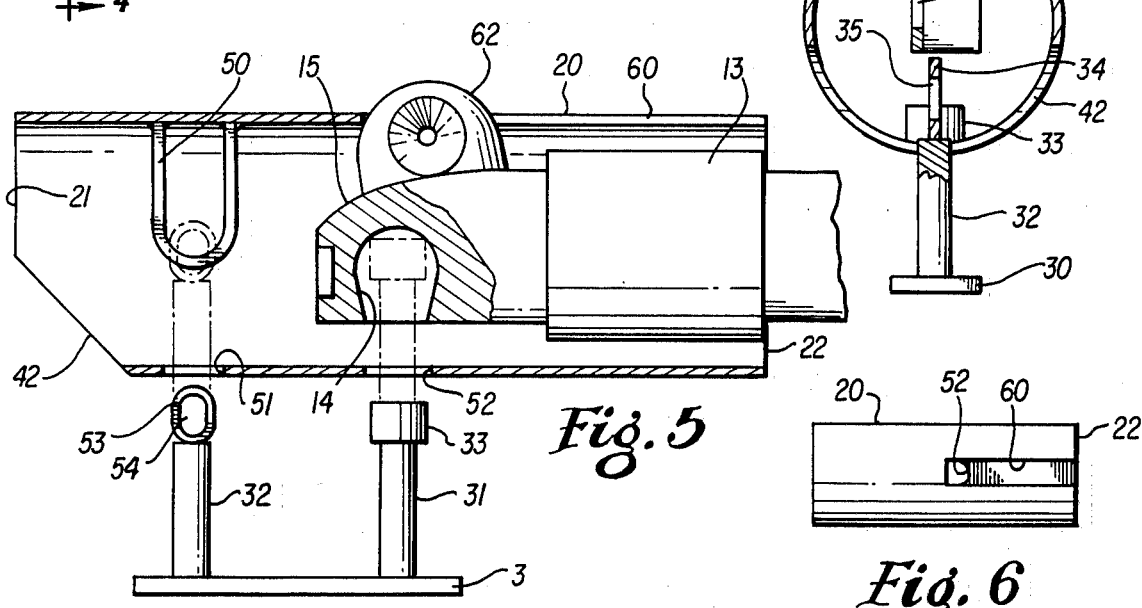
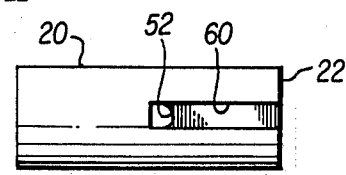

TRAILER HITCH LOCK

BACKGROUND OF THE INVENTION

1. Field of the Invention

This invention is generally directed to locking devices for trailer or towing hitches and specifically to a trailer hitch lock assembly which completely surrounds the socket end portion of the trailer hitch and is securely retained in interlocking relationship thereto to thereby prevent unauthorized use of or access to the trailer hitch socket.

2. History of the Art

There currently exists a substantial problem with the theft and unauthorized use of towed vehicles including boat trailers, storage or moving trailers and livestock or farm trailers. Many of these towed vehicles are connected to a towing vehicle by means of a hitch bar which includes a socket member which is selectively seated during use around a ball carried by the tow bar of the towing vehicle.

In previous attempts to discourage the theft of trailers having socket type hitches, various types of locks and theft prevention devices have been used to obstruct or otherwise make it difficult to utilize the socket of the trailer towing hitch. In U.S. Pat. No. 3,237,969 to Geresy, two types of hitch locks are disclosed. In the first embodiment, a plate is fitted around a rim projecting from the socket portion of the trailer hitch and extends across the opening into the hitch socket. A hinged plate is locked to the first plate in order to anchor the lock in place. In the second embodiment, a ball member is retained in the trailer hitch socket by a lock or lock and pin assembly which is mounted through aligned openings made through the trailor tongue adjacent the hitch socket.

In the foregoing prior art locks, the locking member such as a padlock is exposed exteriorly of the locking assembly and thus may be easily tampered with by someone desiring to dismantle or remove the assembly. In addition, the ball retaining lock requires that some modification be made to the trailer towing hitch in order to accommodate the locking pins associated with the lock. Other prior art trailer locking devices having exteriorly exposed locking members include U.S. Pat. Nos. 3,434,741 to Grant, Jr.; 3,884,045 to Vuillemot; and 4,032,171 to Allen et al.

Another form of trailer hitch lock is disclosed in U.S. Pat. No. 4,141,569 to Dilk. This lock includes a frame having a post mounted thereto which is inserted into the socket of the trailer hitch. A cover is hingedly mounted to the frame and includes a second post which extends downwardly to a point adjacent the top of the socket portion of the trailer hitch when the lock is positioned on the hitch. A keeper and a hasp are disposed within a partially enclosed housing connected adjacent to the main frame and are secured by a conventional padlock. This type of lock is somewhat structurally complicated and is only as strong as the hinge element which connects the frame to the closure or cover of the lock assembly.

SUMMARY OF THE INVENTION

This invention is directed to an elongated locking assembly for use in preventing the theft or unauthorized use of a trailer having socket type hitches and includes a housing which is slideably disposed over and entirely around the socket end of the trailer hitch and which extends outwardly therefrom. A flange member is mounted inwardly of the outer end of the housing and has an opening therethrough for selectively receiving the locking bolt of a conventional lock. A locking bar has a first upstanding pin member which is receivable within the trailer hitch socket after passing through a first opening along the lower portion of the lock assembly housing. A second upstanding member having an opening therein is carried by the locking bar and is aligned with the flange member within the housing after passing through a second opening along the lower portion of the lock assembly. The locking bar is selectively secured to the housing by means of a conventional lock which includes a locking bolt which extends through the aligned openings in the second upstanding member and the flange member. In one embodiment, the openings through the lower portion of the housing are shaped to prevent the removal or direct displacement of the locking bar from the lock assembly housing.

It is the primary purpose of the invention to provide a trailer hitch lock which includes an elongated housing which is placeable over and entirely around the end portion of the trailer hitch and which is of a length to extend outwardly therefrom so as to also provide a housing for covering the locking member so that such locking member cannot be easily tampered with.

It is another object of the present invention to provide a trailer hitch lock wherein the locking mechanism is enclosed within the lock assembly housing during use to thereby protect the locking mechanism from the deleterious effect of the weather.

It is yet a further object of the present invention to provide a locking assembly for trailer hitches having an elongated housing which permits the lock assembly to be utilized to enclose and thereby prevent tampering with the locking collar of conventional hammer blow type hitches.

It is also an object of the present invention to provide a locking assembly for trailers wherein the components of the locking assembly are maintained in joined relationship and are lockable to one another after the housing of the assembly is positioned over the end of the trailer hitch.

It is a further object of the present invention to provide a locking assembly for use with trailer hitches wherein the components of the lock assembly are protected from unauthorized tampering by being enclosed within a substantially continuous housing.

It is another object of the present invention to provide a locking assembly for use with trailer hitches which are structurally relatively uncomplicated and therefore inexpensive to manufacture.

In one embodiment of the invention, the locking assembly is modified for specific use with trailer hitches having enlarged flange members extending from the socket portion of the hitch. In this embodiment the locking assembly includes an elongated generally tubular housing having a slot extending along a portion of the upper surface thereof through which the flange members may be selectively received as the locking assembly is placed in surrounding engagement with the end portion of the trailer hitch.

IN THE DRAWINGS

FIG. 1 is an assembly view showing the lock assembly of the present invention as it is about to be placed over the end of a hammer blow trailer hitch.

FIG. 2 is a cross-sectional view showing the engagement between the locking bar and the hitch socket and housing of the present invention.

FIG. 3 is a cross-sectional view of the locking assembly of an embodiment of the present invention.

FIG. 4 is a cross-sectional view taken along lines 4—4 of FIG. 3.

FIG. 5 is a cross-sectional view of other embodiments of the lock assembly of the present invention.

FIG. 6 is a top plan view showing modified tubular housing of FIG. 5.

DESCRIPTION OF PREFERRED EMBODIMENT

With continued reference to the drawings, the lock assembly 10 of the present invention is illustrated as it is used to secure a trailer hitch such as the hammer blow type hitch 11 shown in the drawings. The conventional hammer blow hitch includes a trailer tongue 12 and a locking collar 13 and a socket 14 formed in the end portions 15 thereof. Although the invention is shown as being used with a hammer blow type hitch, the locking assembly can be used with other types of trailer hitches of the socket type.

The lock assembly 10 includes an elongated cylindrical housing 20 which is opened at each end thereof with the outermost end being designated as 21 and the innermost end being designated as 22. A pair of spaced openings 23 and 24 are provided through the lower portion of the housing with opening 24 generally being disposed along the central portion of the housing while opening 21 is disposed toward the front open portion 21 of the housing. Mounted interiorly of the housing by welding or other means is a flange element 25. The flange element extends downwardly from the uppermost portion of the housing toward opening 23. An opening 26 is provided through the flange member 25 for purposes which will be discussed in greater detail hereinafter.

In order to secure the housing in closed relationship around the socket end of the trailer hitch, a locking bar 30 is provided having a first upwardly extending member or pin 31 mounted adjacent one end thereof and a second upwardly extending member or rod 32 extending from the other or forward end thereof. An enlarged head 33 is provided on the pin member 31 and is selectively received during use within the socket of the trailer hitch. It should be noted that although enlarged head 33 is shown mounted to the pin member 31 that the use of the enlarged head is optional and that it is sufficient in order to prevent unauthorized use of the trailer socket that the pin member 31 obstruct the opening into the socket member by extending inwardly thereof. A plate member 34 is secured to the upper portion of the rod 32 and extends generally parallel with the flange member 25 mounted interiorly of the housing 20. An opening 35 is provided through the plate 34 with such opening cooperatively aligning with the opening 26 in the flange element 25 when the locking bar 30 is engaged or adjacent to the lower portion of the housing as shown in FIG. 2.

After the locking bar has been urged upwardly so that the bulbous or enlarged head of the pin member is positioned within the socket 14 of the trailer hitch and the plate 34 carried by the rod member 32 positioned so that the opening 27 therein is aligned with the opening 26 in the flange member, a conventional pad, combination or key lock 40 is utilized so that the locking bolt 41 thereof extends through the aligned openings thereby securing the locking bar to the housing. If desired, the front portion 21 of the housing may be cut away or beveled as shown at 42 to permit the end portion 43 of the lock 40 to be exposed along the lower leading portion of the housing.

With particular respect to FIG. 3, the locking bar 30 is disclosed as being suspended from the housing 20 with the enlarged head 33 of the pin member 31 resting on the lower inner wall 45 of the housing. Similarly, the plate 34 rests against the lower inner surface 45 thereby supporting the rod member 32 and maintaining the forward portion of the locking bar in spaced relationship with the housing. In this embodiment, the openings through the lower portion of the housing 23 and 24 are of a size or shape to restrict the direct passage of the plate 34 and head portion 33 of the pin member 31 therethrough. In this manner the locking bar may not be easily displaced from its mounted relationship with the housing, and in use, once the housing has been placed over the end portion of the trailer hitch, as shown in FIG. 2, it is only necessary to urge the locking bar upwardly until it engages the lower portion of the housing at which point the head portion 33 of the pin member 31 will be positioned within the socket 14 of the trailer hitch while the plate 34 carried by the rod member 32 will be aligned with the flange member 25 carried by the housing.

The housing is preferably constructed of steel or other metallic pipe and is of sufficient diameter to permit the housing to be slideably positioned over and around the end portion of the trailer hitch with sufficient clearance to permit the head portion 33 of the pin member 31 to pass beneath and in proximity to the socket portion 14 of the trailer hitch. Although the length of the lock assembly may be varied, when being used with a hammer blow type hitch, it is perferred that the housing extend a sufficient distance along the length of the hitch to insure that the locking collar 13 is enclosed within the housing.

Another embodiment of the invention is disclosed in FIG. 5. In this embodiment, the housing 20 includes a steel ring or bracket member 50 which is welded or otherwise secured to the upper portion thereof in place of the flange member 25 discussed with respect to FIGS. 1 through 4. In addition to the bracket member 50, a pair of spaced openings 51 and 52 are provided through the lower portion of the housing in order to permit the passage of the pin member 31 and rod member 32 of the locking bar 30 therethrough. Although the pin member has the same head portion 22 attached thereto, the plate 34 normally carried by the rod 32 is replaced with a ring member 53. The ring member is of a smaller size than the plate member having a diameter substantially equal to that of the rod member 32, and also defines an opening 54 therein.

As shown in the drawings, the openings 51 and 52 are of a larger diameter then the openings 23 and 24 shown with respect to the embodiment of FIGS. 1 through 4. In the embodiment shown in FIG. 5, the head portion 33 of the pin member 31 and the ring member 53 of the rod member 32 are easily moved through the openings 51 and 52 into proper alignment with the socket member 14 and bracket member 50 carried by the housing 20. In this embodiment, the locking bar 30 may be freely detached from engagement with the housing during nonuse.

In addition to the different sizes of the openings 51 and 52 in the embodiment of FIG. 5, the housing 20 may have an elongated slot 60 formed in the upper surface thereof. The slot 60 extends approximately one-half the length of the housing from a point generally in vertical alignment with the opening 52 to the innermost end 22 of the housing. The slot is formed of a width to permit an upstanding flange member 62 which may be mounted or formed along the end portion 15 of the trailer hitch as is the case in some types of hammer blow hitches. In this manner, the slot will provide clearance for the flange members while still substantially surrounding the end of the trailer hitch to thereby prevent unauthorized access thereto.

Although the length of the pin member 31 and rod member 32 of the locking bar may vary depending upon the type of trailer hitch to which the locking assembly is mounted, it is preferred that the various dimensions and alignment of openings between the locking members result in the locking bar 30 being retained in abutting relationship against the lower surface of the housing as shown in FIG. 2. In this manner, it will not be possible to directly tamper with the pin member 31 or rod member 32 at a point exteriorly of the housing. Additionally, the spaced openings in the lower portion of the cylindrical housing may be formed as a single elongated narrow slot which slot is somewhat wider at the point of the spaced openings.

I claim:

1. A locking apparatus for securing trailer hitches having ball receiving socket portions comprising an elongated housing having wall portions and front and rear open end portions, a bracket means mounted within said housing adjacent said front end portion, a locking bar means having a base portion and first and second upwardly extending members, said first and second upwardly extending members being moveably disposed through said wall portions of said housing, means for securing said second upwardly extending member to said bracket member within said housing and said first upwarding extending member being disposed within the socket of the trailer hitch when said housing is placed over the ball receiving socket portion thereof and said second upwardly extending member is secured to said bracket member.

2. The locking apparatus of claim 1 in which said housing includes first and second spaced openings through said wall portions thereof, said first and second upwardly extending members being disposed through said first and second openings, respectively.

3. The locking apparatus of claim 2 in which said housing is generally cylindrical.

4. The locking apparatus of claim 3 in which said front end portion of said housing includes a beveled wall portion which extends downwardly toward said rear end portion of said housing.

5. The locking apparatus of claim 2 in which said bracket means has an opening therein and said second upwardly extending member of said locking bar means has an opening therein, said openings in said bracket means and said second upwardly extending member being generally aligned when said base portion of said locking bar means is adjacent said housing, said means for securing said second upwardly extending member to said bracket member including a lock having a locking bolt which extends through said openings in said second upwardly extending member and said bracket means.

6. The locking apparatus of claim 5 in which each of said first and second upwardly extending members of said locking bar means includes an enlarged uppermost portion, said opening in said second upwardly extending member being in said uppermost portion.

7. The locking apparatus of claim 6 in which said uppermost portions of said first and second upwardly extending members are of a dimension to prohibit their passage through said first and second openings in said housing so that said locking bar means is slideably carried by said housing.

8. The locking apparatus of claim 6 in which said uppermost portion of said second upwardly extending member includes a generally planar plate having an opening therethrough.

9. The locking apparatus of claim 8 in which said bracket means is a plate means having an opening therethrough.

10. The locking apparatus of claim 6 in which said uppermost portion of said second upwardly extending member is a ring member.

11. The locking apparatus of claim 6 in which said first opening in said housing is spaced generally centrally of said front and rear end portions of said housing.

12. The locking apparatus of claim 2 in which said first and second opening in said housing are of a size to permit said first and second upwardly extending members of said locking bar means to be removably displaced therethrough.

13. The locking apparatus of claim 2 including an elongated slot formed through said wall portions of said housing and extending from said rear open-end portion toward said front open-end portion, said elongated slot being formed through said wall portions of said housing at a point remote from said first and second openings therethrough.

14. A locking apparatus for use in securing a trailer hitch of the hammer blow type having a locking collar and an end portion having a ball receiving socket therein comprising, an elongated housing having front and rear open-end portions and generally continuous sidewall portion, first and second spaced openings through said sidewall portion of said housing, a bracket means mounted within said housing adjacent said front end portion, an opening in said bracket means, a locking bar means having a base and first and second projection members extending from said base, said first and second projection members being slideably disposed through said first and second opening in said housing, said second projection member having an uppermost portion having an opening therein, lock means selectively disposable through said openings in said bracket means and said uppermost portion of said second projection member to thereby secure said second projection member to said bracket means when said first projection member is disposed within the socket of the trailer hitch, and said housing extending over and around the end portions of the trailer hitch and the locking collar thereof.

* * * * *